(12) United States Patent
Park et al.

(10) Patent No.: US 9,854,600 B2
(45) Date of Patent: Dec. 26, 2017

(54) METHOD FOR CONTROLLING TRANSMISSION OF UPLINK CONTROL INFORMATION ON PLURALITY OF SERVING CELLS, AND APPARATUS THEREFOR

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

(\*) Notice: Subject to any disclaimer, the term of this patent is extended or adjusted under 35 U.S.C. 154(b) by 178 days.

(21) Appl. No.: 14/780,176

(22) PCT Filed: Mar. 25, 2014

(86) PCT No.: PCT/KR2014/002524
§ 371 (c)(1),
(2) Date: Sep. 25, 2015

(87) PCT Pub. No.: WO2014/157927
PCT Pub. Date: Oct. 2, 2014

(65) Prior Publication Data
US 2016/0044655 A1 Feb. 11, 2016

(30) Foreign Application Priority Data

Mar. 28, 2013 (KR) .................. 10-2013-0033867
Dec. 13, 2013 (KR) .................. 10-2013-0155297

(51) Int. Cl.
*H04L 12/50* (2006.01)
*H04W 72/12* (2009.01)
*H04W 72/04* (2009.01)

(52) U.S. Cl.
CPC .... *H04W 72/1284* (2013.01); *H04W 72/0426* (2013.01)

(58) Field of Classification Search
CPC ................................................. H04W 72/0406
(Continued)

(56) References Cited

U.S. PATENT DOCUMENTS

2010/0098012 A1 4/2010 Bala et al.
2010/0195575 A1 8/2010 Papasakellariou et al.
(Continued)

FOREIGN PATENT DOCUMENTS

KR 10-2011-0084964 A 7/2011
KR 10-2012-0011817 A 2/2012

OTHER PUBLICATIONS

ZTE, "Remaining Open issues of Simultaneous transmission of UL Channels/Signals", R1-110165, 3GPP TSG RAN WG1 Meeting #63bis, Dublin, Ireland, Jan. 17-21, 2011, pp. 1-3.

*Primary Examiner* — Dang Ton
(74) *Attorney, Agent, or Firm* — IP Legal Services, LLC (57) ABSTRACT

The present disclosure relates a method and apparatus for transmitting uplink control information on a plurality of serving cells for supporting carrier aggregation technology between base stations. The method of a user equipment may include comparing a number K of Uplink Control Informations (UCIs) to be simultaneously transmitted and a number M of UCIs available for simultaneous transmission and selecting M UCIs from UCIs to be simultaneously transmitted when the number K is greater than the number M and transmitting, to a Base Station (BS), the selected M UCIs through a Physical Uplink Control CHannel (PUCCH) of each serving cell. The number M is less than or equal to the N, and the number M is a natural number greater than or equal to 1.

19 Claims, 8 Drawing Sheets

(58) Field of Classification Search
USPC .......................................................... 370/329
See application file for complete search history.

(56) References Cited

U.S. PATENT DOCUMENTS

| | | |
|---|---|---|
| 2010/0272019 A1 | 10/2010 | Papasakellariou et al. |
| 2011/0141928 A1 | 6/2011 | Shin et al. |
| 2013/0039321 A1 | 2/2013 | Kim et al. |
| 2013/0229998 A1 | 9/2013 | Noh et al. |
| 2014/0071928 A1 | 3/2014 | Papasakellariou et al. |
| 2016/0302129 A1* | 10/2016 | Lohr .................... H04W 36/30 |

* cited by examiner

```
SCellToAddModList-r10 ::=SEQUENCE (SIZE (1..maxSCell-r10)) OF SCellToAddMod-r10
SCellToAddMod-r10 ::=      SEQUENCE {
    sCellIndex-r10              SCellIndex-r10,
    cellIdentification-r10      SEQUENCE {
        physCellId-r10              PhysCellId,
        dl-CarrierFreq-r10          ARFCN-ValueEUTRA
    }                                                  OPTIONAL, -- Cond SCellAdd
    radioResourceConfigCommonSCell-r10    RadioResourceConfigCommonSCell-r10    OPTIONAL,   -- Cond SCellAdd
    radioResourceConfigDedicatedSCell-r10 RadioResourceConfigDedicatedSCell-r10 OPTIONAL,   -- Cond SCellAdd2
    sCellUCI_SimultaneousTxIndicator      BOOLEAN,                                           315
    [[ dl-CarrierFreq-v1090               ARFCN-ValueEUTRA-v9e0   OPTIONAL  -- Cond EARFCN-max
    ]]
}
```

METHOD FOR CONTROLLING TRANSMISSION OF UPLINK CONTROL INFORMATION ON PLURALITY OF SERVING CELLS, AND APPARATUS THEREFOR

CROSS REFERENCE TO RELATED APPLICATIONS

This application is a National Stage Patent Application of PCT International Patent Application No. PCT/KR2014/002524 (filed on Mar. 25, 2014) under 35 U.S.C. §371, which claims priority to Korean Patent Application Nos. 10-2013-0033867 (filed on Mar. 28, 2013) and 10-2013-0155297 (filed on Dec. 13, 2013), the teachings of which are incorporated herein in their entireties by reference.

TECHNICAL FIELD

The present disclosure relates to a method and apparatus for transmitting uplink control information of a plurality of serving cells to support carrier aggregation between base stations.

BACKGROUND ART

Due to advances in communication systems, various wireless terminals have been introduced to consumers, such as companies and individuals. Current mobile communication systems have been affiliated with $3^{rd}$ generation partnership project (3GPP), for example, Long Term Evolution (LTE), LTE-Advanced, and the like. Such mobile communication systems may be capable of transmitting and receiving a large amount of data at a high speed. Furthermore, the mobile communication systems may be capable of transmitting, receiving, and processing various types of data, such as digital data, multimedia data, radio signal as well as a voice data. Accordingly, there is a demand for developing a technology for transmitting a large amount of data at a high transmit rate as fast as a wired communication network. For example, a scheme has been introduced to transmit a large amount of data at a high transmit rate by using a plurality of cells.

There is also a demand for developing a technology for performing uplink transmission in a plurality of cells or small cells and for controlling transmission of a channel of uplink control information.

DETAILED DESCRIPTION OF THE INVENTION

Technical Problem

Therefore, embodiments of the present disclosure have been made in view of the above-mentioned problems and provide a technology and a method for controlling independent transmission of uplink control information for each serving cell.

Technical Solution

In accordance with an aspect of the present disclosure, there is provided a method of a User Equipment (UE) for controlling transmission of uplink control information in a plurality of serving cells. The method may include comparing a number K of UCIs to be simultaneously transmitted and a number M of UCIs available for simultaneous transmission, selecting M UCIs from the UCIs to be simultaneously transmitted when the number K is greater than the number M, and transmitting, to a Base Station (BS), the selected M UCIs through a Physical Uplink Control CHannel (PUCCH) of each serving cell. The number M is less than or equal to the number N, and the number M is a natural number greater than or equal to 1.

In accordance with another aspect of the present disclosure, there is provided a method of a Base Station (BS) for receiving uplink control information in a plurality of serving cells. The method may include receiving, from a User Equipment (UE), M or fewer UCIs through a Physical Uplink Control CHannel (PUCCH) of each serving cell, a number M indicates a number of UCIs available for simultaneous transmission and determining the UCIs. When a number K of UCIs to be simultaneously transmitted by the UE is greater than the number M, one or more UCIs are transmitted through the PUCCH. The number M is less than or equal to the number N that indicates the number of serving cells, and the number M is greater than or equal to 1.

In accordance with another aspect of the present disclosure, there is provided a UE for controlling transmission of uplink control information in a plurality of serving cells. The UE may include a receiving unit, a controller, and a transmitting unit. The receiving unit may be configured to receive a signal from the BS. The controller may be configured to compare a number K of UCIs to be simultaneously transmitted and a number M of UCIs available for simultaneous transmission and configured to select M UCIs from the UCIs to be simultaneously transmitted when the number K is greater than the number M. The transmitting unit is configured to transmit the selected M UCIs to a Base Station (BS) through a Physical Uplink Control CHannel (PUCCH) of each serving cell. The number M is less than or equal to a number N, and the number M is a natural number greater than or equal to 1.

In accordance with another aspect of the present disclosure, there is provided a BS for receiving uplink control information in a plurality of serving cells. The BS may include a transmitting unit, a receiving unit, and a controller. The transmitting unit may be configured to transmit a signal to a User Equipment (UE). The receiving unit may be configured to receive, from the UE, M or fewer UCIs through a Physical Uplink Control CHannel (PUCCH) of each serving cell. M indicates the number of UCIs available for simultaneous transmission. The controller is configured to determine the UCIs. When a number K of UCIs to be simultaneously transmitted by the user equipment is greater than the number M of UCIs available for simultaneous transmission, UCIs one or less than the number K are transmitted through the PUCCH. The number M is less than or equal to a number N, and the number M is a natural number greater than or equal to 1.

Advantageous Effects

According to embodiments of the present disclosure, it uplink control information is independently transmitted for each serving cell.

MODE FOR CARRYING OUT THE INVENTION

Hereinafter, a few embodiments of the present disclosure will be described with reference to the exemplary drawings. In the following description, the same elements will be designated by the same reference numerals although they are shown in different drawings. Further, in the following description of the present invention, a detailed description of known functions and configurations incorporated herein will be omitted when it may make the subject matter of embodiments of the present disclosure rather unclear.

The wireless communication system may be widely installed so as to provide various communication services, such as a voice service, packet data, and the like. The wireless communication system may include a User Equipment (UE) and a Base Station (BS or an eNB). Throughout the specifications, the user equipment may be an inclusive concept indicating a terminal utilized in wireless communication, including a UE (User Equipment) in wideband code division multiple access (WCDMA), long term evolution (LTE), high speed packet access (HSPA), and the like, and an MS (Mobile station), a UT (User Terminal), an SS (Subscriber Station), a wireless device, and the like in global system for mobile communications (GSM).

A base station or a cell may generally refer to a station where communication with a User Equipment (UE) is performed, and may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, in the specification, the base station or the cell may be construed to be an inclusive concept indicating a portion of an area or function covered by a BSC (Base Station Controller) in CDMA, a NodeB in WCDMA, an eNB or a sector (site) in LTE, and the like, and this concept may include various coverage areas, such as a megacell, a macrocell, a microcell, a picocell, a femtocell, a communication range of a relay node, an RRU, and an RU, and the like.

Each of the above mentioned various cells has a base station that controls a corresponding cell, and thus, the base station may be construed in two ways: i) the base station may be a device itself that provides a megacell, a macrocell, a microcell, a picocell, a femtocell, and a small cell in association with a wireless area, or ii) the base station may indicate a wireless area itself. In i), all devices that interact with one another so as to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. A wireless area itself that receives or transmits a signal from the perspective of a UE or a neighboring base station, may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. The user equipment and the base station are used as two inclusive transceiving subjects (Uplink and Downlink) to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Multiple access schemes may be unrestrictedly applied to the wireless communication system. The wireless communication system may utilize varied multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. An embodiment of the present invention may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be ultra-mobile broadband (UMB). The present disclosure may not be limited to a specific wireless communication field, and may include all technical fields to which the technical idea of the present invention is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), PCFICH (Physical Control Format Indicator CHannel), PHICH (Physical Hybrid ARQ Indicator CHannel), PUCCH (Physical Uplink Control CHannel), and the like, and may be configured as a data channel, such as PDSCH (Physical Downlink Shared CHannel), PUSCH (Physical Uplink Shared CHannel), and the like, so as to transmit data.

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system according to embodiments refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and UEs.

A multiple transmission/reception points (or a transmission/reception communication system) may be a base station or a macro cell (hereinafter, referred to as an 'eNB') and at least one RRH that is connected to an eNB through an optical cable or an optical fiber and is wiredly controlled, and has a high transmission power or a low transmission power within a macrocell.

Hereinafter, a downlink refers to communication or a communication path from a multiple transmission/reception points to a UE, and an uplink refers to communication or a communication path from a UE to multiple transmission/reception points. In a downlink, a transmitter may be a part of multiple transmission/reception points and a receiver may be a part of a UE. In an uplink, a transmitter may be a part of a UE and a receiver may be a part of multiple transmission/reception points.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received or a signal is transmitted or received through a PDCCH" includes "an EPDCCH is transmitted or received or a signal is transmitted or received through an EPDCCH".

That is, a downlink control channel used herein may indicate a PDCCH or an EPDCCH, and may indicate a meaning including both a PDCCH and an EPDCCH. In addition, for ease of description, a PDCCH, which corresponds to an embodiment of the present invention, may be applied to the part described using a PDCCH.

Further, high layer signaling as used herein includes RRC signaling for transmitting RRC information including RRC parameters.

An eNB executes downlink transmission to UEs. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

Hereinafter, as described with reference to the drawings, a first User Equipment (UE1) may transmit an uplink signal to an eNB, and a second UE may transmit an uplink signal to an RRH.

The Carrier Aggregation (CA) before 3GPP LTE/LTE-Advanced Rel 11 increases a data transmission rate by aggregating one or more Component Carriers (CCs) configured by a base station forming a single cell, or aggregating a CC of a macro cell and CCs of small cells configured using a low power Remote Radio Head (RRH), which are antennas geographically distributed within a macro cell coverage.

Particularly, to apply the CA, a macro cell and an RRH cell are configured to be scheduled under a control of a single eNB. To this end, an ideal backhaul needs to be established between a macro cell node and an RRH. The ideal backhaul indicates a backhaul that shows a significantly high throughput and a significantly low delay, like a dedicated point-to-point connection that uses an optical fiber and Line Of Sight (LOS) microwave. Unlike the above, a backhaul that shows a relatively low throughput and a relatively high delay, such as xDSL (Digital Subscriber Line) and Non-LOS microwave, is referred to as a non-ideal backhaul.

In the LTE/LTE-Advanced system, the CC that operates based on an independent center frequency is referred to as a single cell. This has a meaning different from the concept of a geographic/physical cell formed by a single transmission node established by a network operator such as a single base station/eNB/RRH, or the like. In the present disclosure, the concepts of a cell may be distinguished by context.

When CA is operated for a UE, a CC corresponding to a serving cell to which the corresponding UE enters when the corresponding UE executes initial network entry/re-entry, becomes a primary cell. Information associated with secondary cells to be additionally aggregated based on a capability of the UE through the corresponding primary cell may be configured through an RRC signaling. Subsequently, a cell to be aggregated by the corresponding UE from among the secondary cells configured through the RRC signaling may be activated or deactivated through a MAC Control Element (CE) message. In this manner, the CA is applied.

As described above, when the CA for a UE is applied in the 3 GPP LTE/LTE-Advanced Rel-11 system and the system before that, although cells having independent center frequencies are used, since a single scheduling unit-based CA is applied, a PUCCH resource for transmission of Uplink Control Information (UCI) of the UE to which the corresponding CA is applied may be configured through only a primary cell out of the aggregated serving cells. Accordingly, when the UE to which CA is applied transmits a UCI, the UE transmits the UCI through a PUCCH resource of the primary cell, or transmits the UCI through a PUSCH transmission resource of the primary cell or a PUSCH transmission resource of a secondary cell, based on configuration information associated with PUCCH/PUSCH simultaneous.

Figure 1:
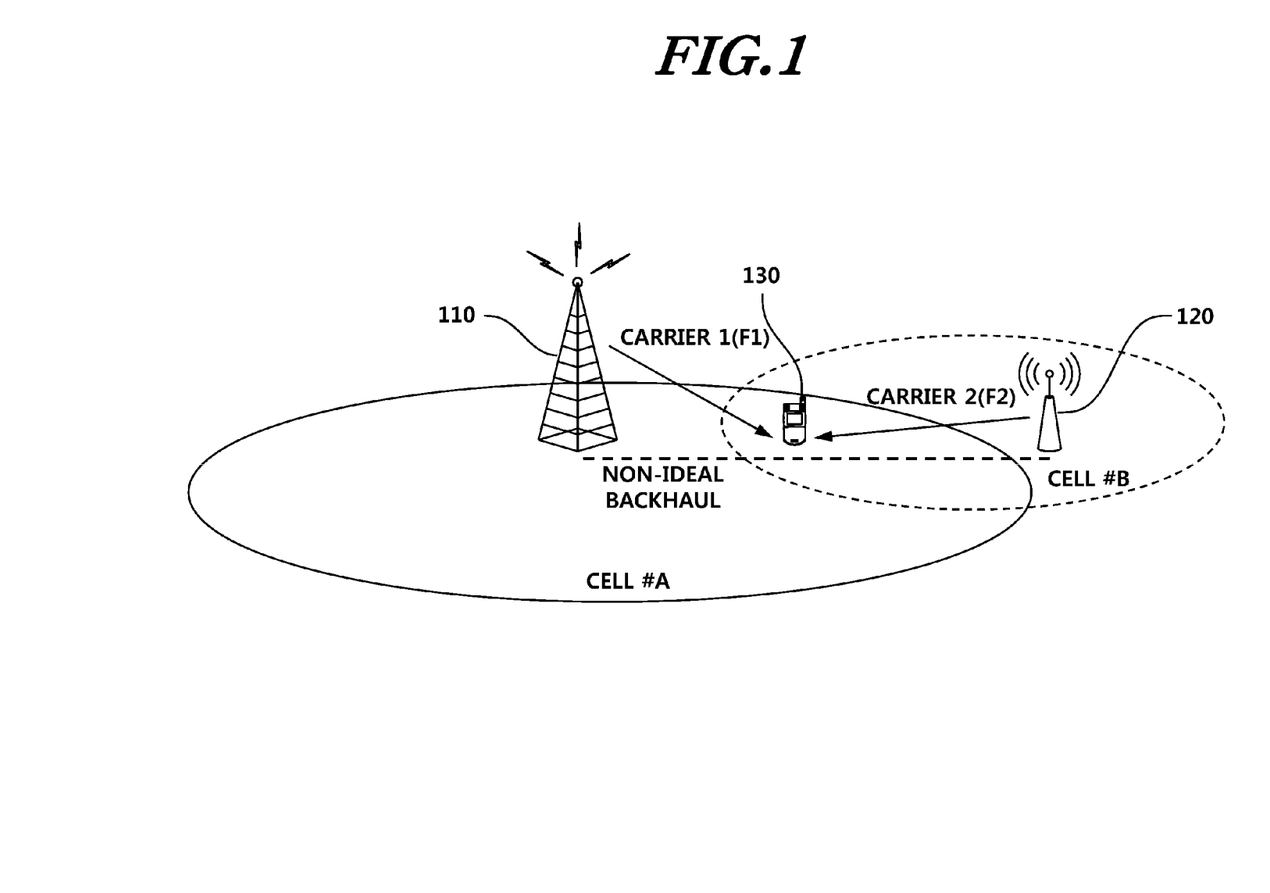
FIG. 1 illustrates an example of a network configuration scenario according to an embodiment of the present disclosure.

As shown in FIG. 1, a UE 130 is located in an overlapping region of cells formed by two or more different BSs 110 and 120 (expressed as various names including eNB/RU/RRH/eNodeB or the like). In order to increase a data transmission rate of such a UE 130, carriers used for data transmission and reception among BSs may be aggregated by aggregating frequency bands supported by the BSs 110 and 120. A type of a cell formed by each BS 110 and 120 in FIG. 1 may include various cells classified based on a coverage, such as, a macro cell, a small cell (for example, a pico cell, a micro cell, or the like), a femto cell, and the like.

Figure 2:
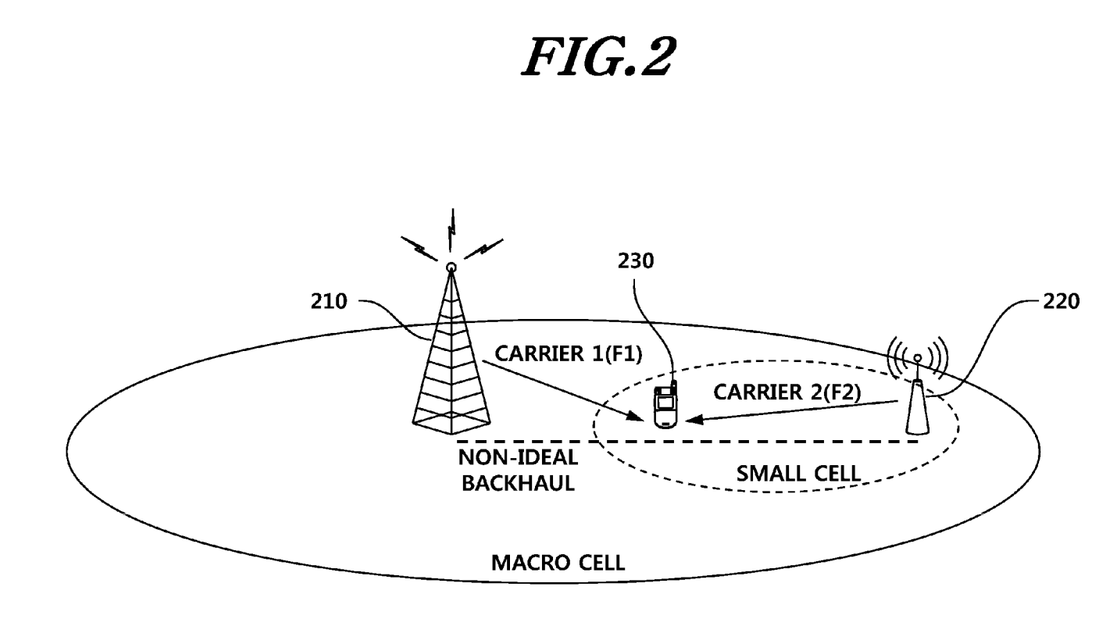
FIG. 2 illustrates another example of a network configuration scenario according to an embodiment of the present disclosure.

As a representative scenario that requires the CA among BSs, the scenario may aggregate carriers among small cells formed to overlap a macro cell, as described in FIG. 2.

FIG. 2 illustrates another example of a network configuration scenario according to an embodiment of the present disclosure.

When a small cell is formed by a low-power BS, such a small cell uses a relatively lower Transmission (Tx) power than a general macro BS and covers a cell of a smaller size than the macro cell. Thus, such a small cell may increase spatial recyclability of a frequency when compared to a macro cell-based network structure. Also, when the small cell is deployed at a location overlapping a macro cell, the small cell may be useful for processing a high data transmission rate in a local area, such as a hot spot where a significant amount of data traffic occurs. However, when the small cell is deployed, the inter-cell interference may become worse. Particularly, in a heterogeneous network scenario where a macro cell and a small cell that use the same frequency band overlap, interference between the macro cell and the small cell may cause a serious deterioration in performance.

Therefore, there is a desire for a small cell enhancement scheme for minimizing interference between a macro cell and a small cell while increasing a data transmission rate of a predetermined local area through introduction of a low-power BS. As an embodiment for the small cell enhancement, inter-BS carrier aggregation (inter-eNB Carrier Aggregation) has been considered, in which a UE 230 that belongs to a small cell coverage additionally establishes a connection with a small cell BS 220 through a small cell frequency band (F2) in a state of having a connection with a macro cell BS 210 through a macro cell frequency band (F1) in an environment where different frequencies are used for a macro cell and a small cell.

However, when an ideal backhaul between a macro BS and a small cell BS is not established as shown in FIG. 2, that is, when a non-ideal backhaul is established between a macro BS and a small cell BS, it is difficult to apply the inter-eNB CA that is based on the existing CA. Particularly, in the case where a UE configures F1 that is a macro cell carrier as a primary cell and applies CA by aggregating F2 that is a small cell carrier as a secondary cell, when the UE transmits a UCI on the primary cell, it is difficult to apply a smooth HARQ operation and radio channel-based scheduling in a small cell due to a backhaul delay.

To generalize the above, when frequency bands supported by two or more BSs are aggregated and used for a UE located in an overlapping region of cells formed by the two or more BSs, as shown in FIG. 1, the above described drawbacks may equally occur in a non-ideal backhaul environment where a backhaul delay time exists between the corresponding BSs.

Embodiments of the present disclosure provide a method for enabling a UE located in an overlapping region of coverages of neighboring BSs (eNB/RRH/RU) in the 3GPP-based wireless mobile communication system to support dual connectivity with the corresponding neighboring BSs. Particularly, this relates to operations of a UE and a BS for supporting inter-BS Carrier Aggregation (inter-eNB Carrier Aggregation) in which a corresponding UE aggregates and uses frequency bands supported by neighboring BSs when the neighboring BSs use different frequency bands.

Embodiments of the present disclosure will propose a UCI transmission method of a UE for applying the inter-BS carrier CA under a non-ideal backhaul where a relatively long backhaul delay time exists between BSs, as shown in FIG. 1. Particularly, although the descriptions of the present disclosure focus on a UCI transmission method for a CA UE that additionally aggregates F2 that is a small cell carrier in the state of configuring a macro cell carrier as a primary cell in a scenario of CA between a macro cell and a small cell, as shown in FIG. 2, it is apparent that the corresponding technology may be equally applied to a scenario of CA between general BSs as shown in FIG. 1. Alternatively, embodiments of the present disclosure may be equally applied to a scenario of CA among a plurality of carriers supported by a single BS. Additionally, although the descriptions will be provided by assuming that a single carrier that each neighboring BS supports is used, embodiments of the present disclosure may not be limited thereto and may be equally applied when the number of carriers is extended to N carriers (N is a natural number). That is, from the perspective of a UE, even when a UE additionally aggregates one or N−1 secondary cells (secondary CCs) in addition to a primary cell (primary CC) currently connected with the UE, embodiments of the present disclosure may be equally applied to each secondary cell aggregation.

According to the CA defined in the 3 GPP LTE/LTE-Advanced Rel-11 system and the system before that, a PUCCH resource (e.g., an uplink control channel) may be allocated in a primary cell among the serving cells associated with a UE when the UE aggregates and uses a plurality of carriers, that is, when the UE is configured with a plurality of serving cells. In this instance, the cell indicates a single component carrier, and in at least one embodiment of the present disclosure, a cell and a Component Carrier (CC) will be interchangeably used. That is, when the corresponding UE transmits uplink control information, the UE may transmit the same through a PUSCH that is an uplink data channel of a primary cell or a secondary cell, or may transmit the same through a PUCCH of the primary cell.

In accordance with at least one embodiment, a method may be provided for enabling a UE to transmit uplink control information when CA is executed in the 3GPP LTE/LTE-Advanced Rel-12 system or the system that follows therefrom. Particularly, unlike the typical LTE/LTE-Advanced Rel-11 system and the system before that, in the Rel 12 system and the system that follows therefrom, more various CA scenarios are considered. For example, one of the scenarios is an inter-BS (or inter-eNB) CA in which a UE located in an overlapping region of coverages of neighboring BSs has connections with the corresponding neighboring BSs through different carriers in an environment where an ideal backhaul line is not secured between the BSs. As the various CA scenarios have been considered, there is a desire for a new uplink control information transmission method, which is different from the uplink control information transmission method that has been applied to the single BS-based CA scenario in the typical Rel-11 system and the system before that. Such a new uplink control information transmission method may be applied to a new CA scenario. For example, in the Rel-12 system or the system that follows therefrom, each serving cell is configured to independently transmit uplink control information. Alternatively, a UE groups a plurality of configured serving cells based on a BS/eNB (a master eNB and a secondary eNB may be distinguished based on macro cell eNB vs. a small cell eNB or an RRC connection) that forms a corresponding serving cell, selects one for each serving cell group, and transmits uplink control information through an uplink of the selected cell for each serving cell group. To this end, in the case of a UE in the Rel-12 system or the system that follows therefrom, an indicator associated with a UCI transmission method is defined, which determines whether to apply a CA-based UCI transmission method defined in the typical LTE/LTE-Advanced Rel-11 or to apply a new UCI transmission method that independently executes transmission for each serving cell. The indicator may be transmitted to a corresponding UE through a MAC CE signaling or a UE-specific RRC signaling when CA is executed. Alternatively, the UE in the Rel-12 system or the system that follows therefrom may define to independently transmit a UCI for each serving cell, or the UE may define a UCI transmission method in a corresponding CA situation based on whether a PUCCH resource is allocated for a secondary cell when addition or activation of the secondary cell is executed.

As described above, the UCI transmission method for each serving cell for the Rel-12 UE may be set to be different from the UCI transmission method in the typical Rel-11 CA. Although embodiments of the present disclosure provide descriptions by assuming the situation in which the UCI transmission method in the Rel-12 CA is newly defined, embodiments of the present disclosure may not limit the above described Rel-12 UCI transmission method for each UE.

Embodiments of the present disclosure will provide a UCI transmission method of a UE, when the UE set to follow the new UCI transmission method for Rel-12 needs to simultaneously transmit UCIs through a plurality of serving cell uplinks.

As a first embodiment, a method of dropping a UCI of a serving cell (Component Carrier) having a higher (or lower) Carrier Indicator Field (CIF) is provided.

According to the first embodiment, a UE aggregating and using N serving cells transmits a UCI of a serving cell having the lowest CIF value and drops UCI transmissions for the remaining service cell when the UE needs to transmit a UCI for each serving cell through an identical uplink subframe because UCIs for two or more serving cells out of the corresponding serving cells are simultaneously generated.

That is, when a UE aggregates and uses N serving cells and when a PUCCH resource is allocated for each serving cell, the corresponding UE independently transmits Uplink Control Information (UCI) for each serving cell. For example, in the case where a BS activates (activation) CC#2 as a secondary cell associated with a UE configuring CC#1 as a primary cell and operates, the UE may independently transmit Uplink Control Information (UCI) for each serving cell when PUCCH resource allocation information for CC#2 is configured through a common RRC signaling and a dedicated RRC signaling for the corresponding UE That is, the UE transmits a UCI, such as HARQ ACK/NACK feedback with respect to downlink data transmission of the primary cell or CQI feedback and Scheduling Request (SR) with respect to the primary cell, through a PUCCH resource or a PUSCH of an uplink subframe of the primary cell. The UE transmits a UCI for a secondary cell through a PUCCH resource or a PUSCH of the secondary cell. In this instance, when UCI transmission for the corresponding primary cell and UCI transmission for the secondary cell are simultaneously executed and when the UE does not support simultaneous transmission of an uplink through different CCs or serving cells, the corresponding UE preferentially transmits a UCI of the primary cell having a low CIF and drops a UCI of the remaining secondary cell. For another example, the UE may preferentially transmit a UCI of a primary cell having a high CIF and may drop a UCI of the remaining secondary cell.

That is, in the case in which CC #1 is configured as a primary cell (CIF value=0) and CC #2, . . . and CC #N are configured as secondary cells, which have CIF values in ascending order, when a UE aggregates and uses N CCs from CC #1, . . . , to CC #N and when UCIs for a plurality of serving cells out of the corresponding serving cells need to be transmitted through an identical uplink subframe, the corresponding UE transmits only a UCI of a serving cell having the lowest CIF value from among the CIFs of the corresponding serving cells through a PUCCH or a PUSCH of the corresponding serving cell and drops the remaining UCIs. In accordance with another embodiment, a UCI of a secondary cell may be dropped instead of that of a primary cell. Alternatively, as further another embodiment, when the number of simultaneous uplink transmissions supported by the corresponding UE is M and when M is less than the number K of UCI simultaneous transmissions executed in the corresponding UE at a predetermined time, M serving cells having a low CIF value may be selected from out of the K serving cells and the selected UCIs may be transmitted.

Additionally, the method of selecting a serving cell for uplink control information transmission based on a CIF may be applied when it is defined to group serving cells aggregated by a UE based on a BS/eNB that forms a corresponding cell as described above, to select one for each serving cell group, and to separately transmit uplink control information for each serving cell group. That is, it is defined to determine a priority of uplink control information transmission based on a CIF value of a serving cell selected for each serving cell group to transmit uplink control information. For example, with respect to a UE that aggregates 5 serving cells from CC#1, CC#2, . . . , to CC#5, when CC#1 and CC#2 out of the 5 serving cells are serving cells configured by a first BS/eNB and when CC#3, CC#4, and CC#5 are serving cells configured by a second BS/eNB having a scheduler separate from the first BS/eNB, it may be defined to configure a corresponding (CC#1, CC#2) as a first serving cell group and to configure a corresponding (CC#3, CC#4, CC#5) as another second serving cell group and to transmit uplink control information associated with the first serving cell group through an uplink subframe of CC#1 and to transmit uplink control information associated with the second serving cell group through an uplink subframe of CC#3. In this instance, when uplink control information transmission associated with the first serving cell group and the uplink control information transmission associated with the second serving cell group may simultaneously occur in CC#1 and CC#3 and when the corresponding UE does not support simultaneous uplink transmission, the method may be defined to transmit only uplink control information of a serving cell group having a low (or high) CIF value based on the CIF values of CC#1 and CC#3, at a corresponding point in time. Alternatively, when each serving cell group is defined, a serving cell group may be prioritized in association with uplink control information transmission. That is, in the above described example, the first serving cell group and the second serving cell group may be prioritized based on the first BS/eNB that forms the serving cell group formed of (CC#1, CC#2) and the second BS/eNB that forms the serving cell group formed of (CC#3, CC#4, CC#5). For example, the method may indicate a serving cell group formed of a BS/eNB establishing an RRC connection with a corresponding CA UE as a master cell group and indicate a serving cell group formed of other BSs/eNBs as a secondary cell group. The method may define a master cell group and a secondary cell group based on whether a serving cell group is formed of a macro cell BS/eNB or a small cell BS/eNB, so as to define uplink control information transmission of the serving cells forming the master cell group to have a higher priority than uplink control information transmission of the serving cells forming the secondary cell group.

As a second embodiment, a priority of each type of UCI commonly applied to configured serving cells is defined.

In accordance with the second embodiment, a priority for each UCI may be defined and a UCI having the highest priority may be transmitted through a corresponding serving cell. That is, when a CA UE needs to transmit UCIs for a plurality of serving cells through an uplink subframe of a corresponding serving cell, the UE may select a serving cell through which a UCI is to be transmitted, based on a type of a UCI of each serving cell. As an example of setting a priority based on a type of UCI, a HARQ ACK/NACK feedback with respect to downlink data transmission may be set to have the highest priority, and an SR and CQI/CSI feedback may be set to have a subsequent priority. As described above, when a priority is set for each UCI, a UCI having the highest priority may be transmitted through a PUCCH or a PUSCH of a corresponding serving cell, and the remaining UCIs may be dropped. Additionally, when UCIs having the highest priority are generated in a plurality of serving cells, whether to execute the corresponding highly-prioritized UCI transmission may be determined based on the method according to the first embodiment. In accordance with another embodiment, when the number of simultaneous uplink transmissions supported by the corresponding UE is M and when M is less than the number K of simultaneous UCI transmissions executed in the corresponding UE at a predetermined time, M UCIs having a high priority may be selected from the UCIs to be transmitted in the K serving cells, and the selected UCIs may be transmitted in corresponding M serving cells.

As a third embodiment, a simultaneous UCI transmission indicator is defined for each secondary serving cell.

The simultaneous UCI transmission indicator (simultaneous UCI Tx indicator) may be defined based on a capability of a UE and an uplink channel environment of the corresponding UE. The simultaneous UCI transmission indicator is a parameter set for each secondary serving cell when the corresponding (secondary) serving cell (CC) is activated, and it determines whether UCI transmission of the corresponding secondary cell is executed in parallel with UCI transmission of a primary cell or UCI transmission of a secondary cell having a CIF value lower than the CIF value of the corresponding secondary cell. That is, when a secondary cell is activated, the method may be defined to transmit a UCI transmission indicator together with PUCCH resource allocation information of the corresponding secondary cell. When the corresponding simultaneous UCI transmission indicator is set, the corresponding UE may transmit the UCI of the corresponding secondary cell in parallel with the UCI of the primary cell or the UCI of a secondary cell having a lower CIF value, through a PUCCH or a PUSCH of an uplink subframe of the corresponding secondary cell. In the case of a secondary serving cell for which a corresponding simultaneous UCI transmission indicator is not set, when UCI transmission occurs in a primary cell or a secondary cell having a lower CIF value, UCI transmission in the corresponding secondary serving cell may be dropped according to the first embodiment. Alternatively, according to the second embodiment, only when a UCI of the primary cell or a UCI of a secondary cell having a lower CIF value is lower than a priority of a UCI of the corresponding secondary serving cell, the UCI transmission of the corresponding secondary serving cell may be executed, and otherwise, the UCI transmission may be dropped.

As a fourth embodiment, the number of simultaneous UCI transmissions (Number of simultaneous UCI Tx configuration) is configured.

As a method similar to the third embodiment, the number of simultaneous UCI Tx may be set and transmitted to a UE when a predetermined secondary cell is activated or deactivated. The information of the number of simultaneous UCI Tx indicates the number of serving cells that the UE can transmit UCI at the same time. The UE may be capable of simultaneously transmitting UCIs in serving cells corresponding to the configured number. That is, when the number of simultaneous UCI transmissions for a UE aggregating and using N CCs is set to M (a natural number less than or equal to N), the UE may simultaneously transmit UCIs in at most M serving cells. In this instance, when the number of cells simultaneously transmitting UCIs is greater than M, M serving cells for UCI transmission may be selected based on the above described first embodiment or second embodiment. For example, when a UE aggregates and uses 5 CCs (serving cells) and the information region for the number of simultaneous UCI transmissions is set to 2, the corresponding UE may simultaneously transmit UCIs through uplink subframes of at most two serving cells. In this instance, when UCIs need to be simultaneously transmitted through three or more serving cells, UCIs may be transmitted through two serving cells having a low CIF value and the UCI of the remaining serving cell may be dropped according to the first embodiment. Alternatively, two serving cells for UCI transmission may be selected based on a priority of a UCI to be transmitted in each serving cell, according to the second embodiment.

As described, the UCI dropping rule has been described through the four embodiments. Such a UCI dropping rule may be applied only when transmission is performed through a PUCCH, and UCI transmission through a PUSCH may be always allowed. That is, when UCIs need to be simultaneously transmitted in a plurality of serving cells, the corresponding UCI dropping rule may not be applied to a serving cell in which UCI transmission through a PUSCH is possible, and a UCI for the corresponding cell may be transmitted through the PUSCH. That is, when simultaneous PUSCH/PUCCH transmission is not set in a serving cell to which a PUSCH resource is allocated, the corresponding UE may not apply the UCI dropping rule and execute piggybacking with respect to the corresponding PUSCH so as to transmit a UCI, and the UE may apply the dropping rule to only serving cells that need to transmit a UCI through a PUCCH (that is, when a PUSCH resource is not allocated or when a simultaneous PUSCH/PUCCH transmission is set). In this instance, the new UCI transmission method in the ReL-12 system or the system that follows therefrom may be forced to not allow simultaneous PUSCH/PUCCH transmission with respect to secondary cells. That is, when a PUSCH resource is allocated with secondary cells, the method may be always defined to execute piggybacking with respect to a PUSCH for transmission.

In the case where a UCI transmission method is defined in the LTE/LTE-Advanced Rel-12 system and the system that follows therefrom according to the above methods and the above new parameters are applied (method 3 or method 4), the corresponding parameters are transmitted to the corresponding UE through a newly defined MAC CE signaling or UE-specific RRC signaling, or an information region for transmitting the corresponding parameter may be defined in an existing MAC CE signaling or UE-specific RRC signaling.

Figure 3:
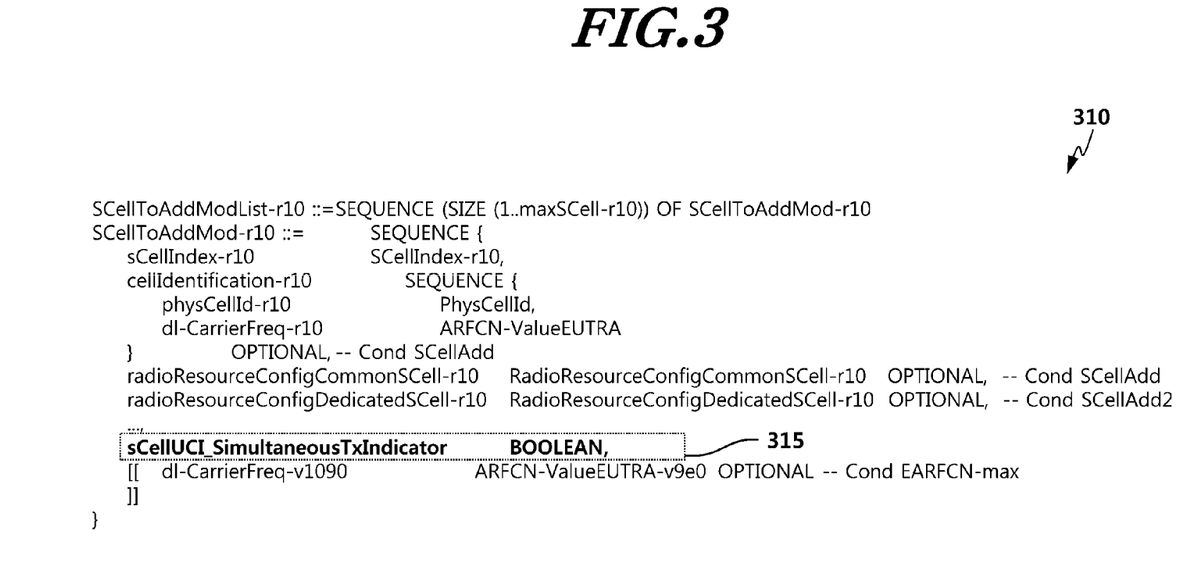
FIG. 3 is a diagram illustrating a part of the configuration of a higher layer RRC signaling message, according to an embodiment of the present disclosure.

FIG. 3 is a diagram partially illustrating configuration of a higher layer RRC signaling message according to an embodiment of the present disclosure.

The diagram 310 of FIG. 3 shows an element associated with the configuration of a secondary cell in an RRC connection reconfiguration (RRCConnectionReconfiguration) message. sCellUCI_SimultaneousTxIndicator 315 may be included as a simultaneous UCI transmission indicator of a cell in information associated with a candidate cell, as shown in the diagram 310. In the diagram 315, sCellUCI_SimultaneousTxIndicator indicates True/False of simultaneous UCI transmission of a secondary cell.

In the case of a MAC CE-based signaling (MAC CE based indication), to indicate simultaneous UCI transmission of a corresponding cell, corresponding indication information may be transmitted through a MAC CE signaling that activates CA of the corresponding secondary cell. When a MAC CE signaling is transmitted for activating a predetermined secondary cell from among candidate secondary cells with respect to a UE that supports CA, it may include simultaneous UCI transmission indication information associated with the corresponding cell. Accordingly, the UE may determine a UCI transmission method for the corresponding secondary cell, based on the simultaneous UCI transmission indication of the corresponding cell, included in the MAC CE signaling activated by the corresponding secondary cell.

Figure 4:
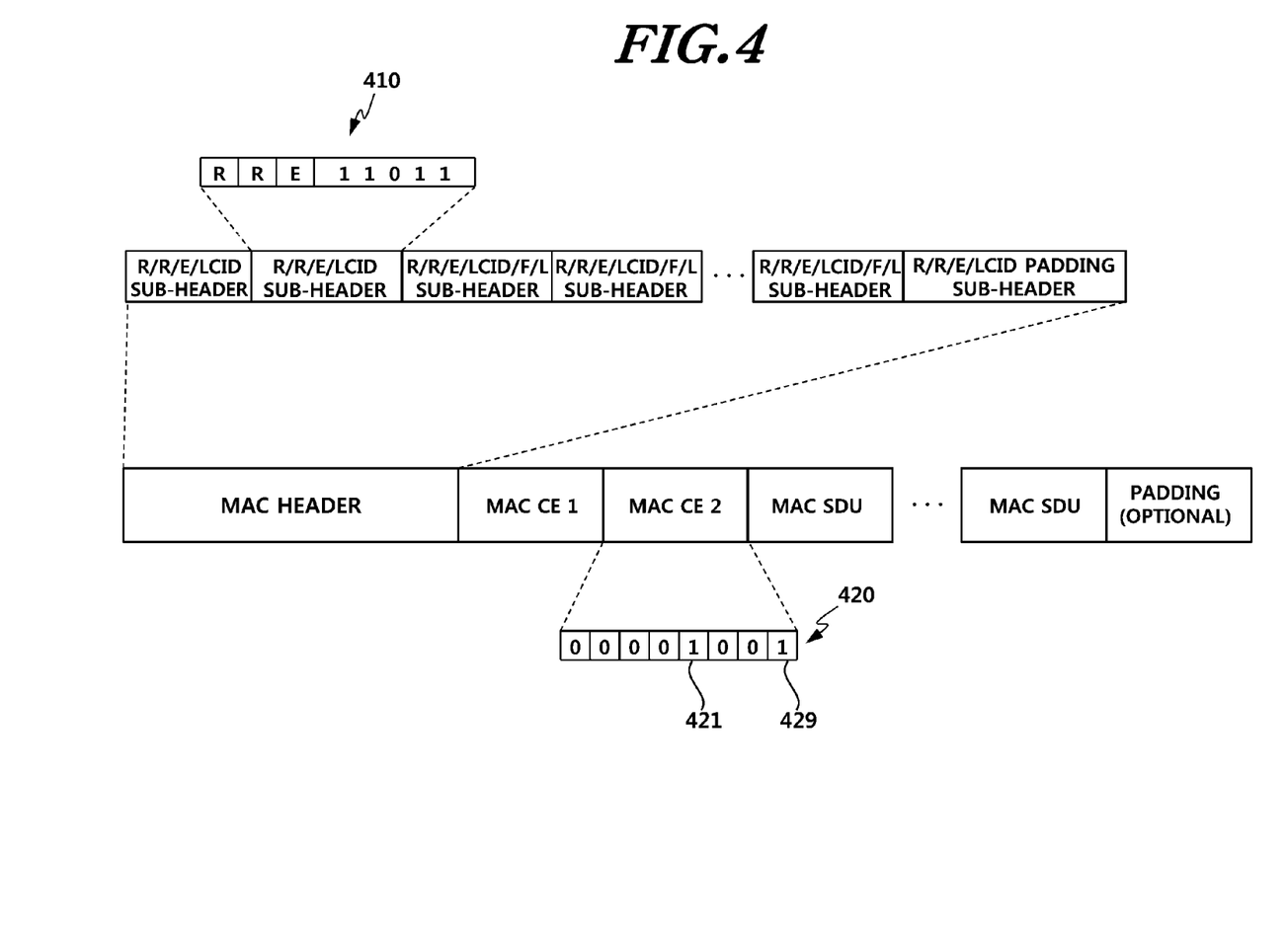
FIG. 4 is a diagram illustrating a media access control (MAC) control element (CE) according to an embodiment of the present disclosure.

FIG. 4 is a diagram illustrating a configuration of a MAC CE according to an embodiment of the present disclosure. For example, FIG. 4 illustrates the configurations of a MAC header and a MAC CE.

TABLE 1

Configurations of a MAC header and a sub-header

| Index | LCID value |
|---|---|
| 00000 | CCCH |
| 00001-01010 | Identity of the logical channel |
| 01011-11010 | Reserved |
| 11011 | Activation/Deactivation |
| 11100 | UE Contention Resolution Identity |
| 11101 | Timing Advance Command |
| 11110 | DRX Command |
| 11111 | Padding |

Referring to the octet configurations of the MAC header and the sub-header of Table 1, the LCID value of the activated/deactivated MAC CE is 11011. In accordance with an embodiment, the MAC sub-header is indicated by the reference numeral 410 of FIG. 4. The MAC sub-header that activates or deactivates a secondary cell may be as shown in the diagram 410.

According to an embodiment of the present disclosure, a MAC CE includes information indicating simultaneous UCI transmission. Thus, a last reserved bit is set to 1, as shown in "00001001" of the reference numeral 420. A bit 421 is set to '1' to activate a cell having SCellIndex 3, a bit 429 (e.g., a reserved bit) is also set to '1' and thus, the UCI transmission in a secondary cell having SCellIndex 3 may be indicated to be simultaneous UCI transmission. As described above, the methods according to the embodiments of the present disclosure may be applied to one or more secondary cells, for example, a plurality of secondary cells. When a MAC CE 420 is configured as "00010101" to activate a plurality of cells, cells of which SCellIndex is 2 and 4 may be activated. Since a last reserved bit is '1', simultaneous UCI transmission is indicated with respect to the activated cells. In the above described example, the simultaneous UCI transmission may be indicated for each cell using a bit different from a last reserved bit or using a separate MAC payload area.

In accordance with at least one embodiment, a provided is a new UCI transmission method that is applicable to a CA UE in the Rel-12 system or the system that follows therefrom. Particularly, when a scheduler of each serving cell is distributed due to the introduction of various scenarios such as inter-eNB CA, CA based on dual connectivity with a small cell it is required to independently transmit a UCI for each serving cell. In this instance, in accordance with at least one embodiment of the present disclosure, a method may be provided for overcoming the ambiguity of operations of a UE and a BS in association with transmission and reception of a UCI, by providing a method of operating the UE and the BS when UCIs need to be simultaneously transmitted in a plurality of serving cells.

Hereinafter, an uplink control channel transmission process will be described for independently transmitting UCIs for each serving cell when a scheduler of each serving cell is distributed in inter-eNB CA and a CA environment based on dual connectivity with a small cell.

Figure 5:
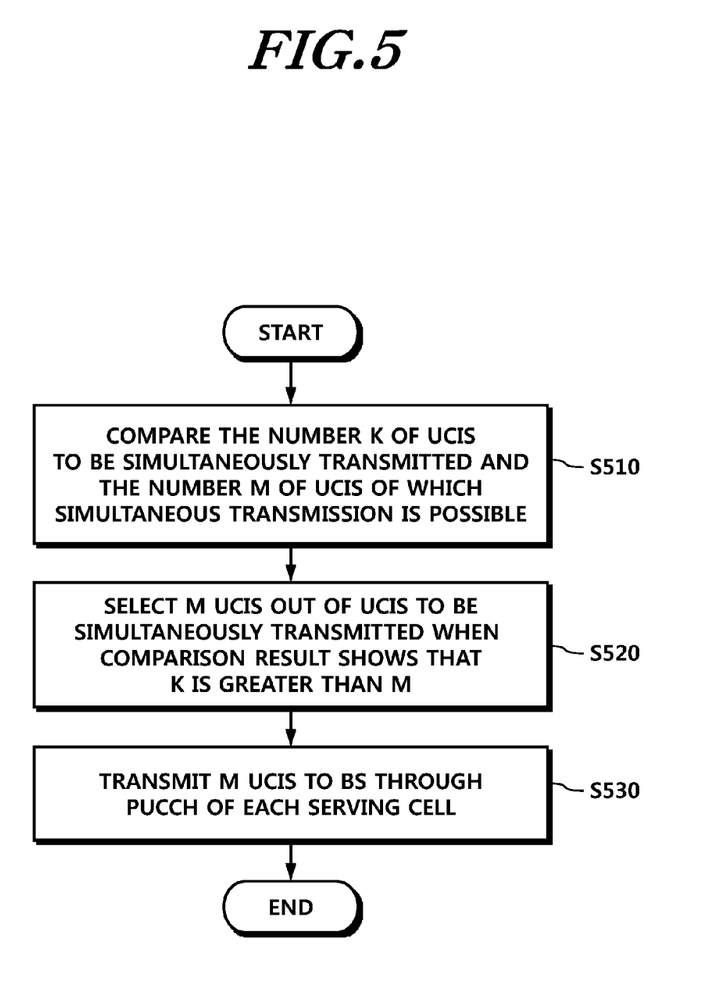
FIG. 5 is a diagram illustrating a process of a User Equipment (UE) for controlling transmission of uplink control information in a plurality of serving cells, according to an embodiment of the present disclosure.

FIG. 5 is a flowchart illustrating a process of a UE for controlling transmission of uplink control information in a plurality of serving cells, according to an embodiment of the present disclosure.

Referring to the first, second, third, and fourth embodiments as described above, a UE compares the number K of UCIs to be simultaneously transmitted and the number M of UCIs available for simultaneous transmission, for controlling transmission of uplink control information in a plurality of serving cells, in operation S510. When the comparison result shows that K is greater than M, the UE selects M UCIs from the UCIs to be simultaneously transmitted, in operation S520. As described in the first and the second embodiments, a UCI of a serving cell having the lowest CIF may be selected, or a UCI may be selected based on a priority of a UCI. For example, UCIs may be selected respective priorities set based on a type of each UCI. As described, a comparatively high priority may be assigned to a HARQ ACK/NACK feedback with respect to downlink data and a comparatively low priority may be assigned to an SR and CQI/CSI feedback. That is, according to the first and the fourth embodiments, the UE may select a UCI from K UCIs based on a Carrier Indicator Field (CIF) of a serving cell. Also, according to the second and the fourth embodiments, the UE may select a UCI from the K UCIs, based on a priority set to a respective UCI. When the first and the second embodiments are applied, M may be 1. In this instance, the UE may select a single UCI.

Also, when serving cells are classified into a plurality of serving cell groups, the UE may select a UCI based on CIFs of serving cells where uplink control information of each serving cell group is transmitted to.

Particularly, the serving cells are classified into two or more serving cell groups, and the selection operation S520 includes defining differential priorities of the serving cell groups, and selecting UCIs based on a priority of corresponding respective serving cell group. Also, a priority of a master cell group may be higher than a priority of a secondary cell group when defining priorities of cell groups for transmission of uplink control information. This indicates prioritizing a cell group itself, and may be applied when a CIF is independently configured for each cell group, for example, when 0, 1, 2, . . . , and the like are sequentially set as CIFs for the CCs forming a master cell group and 0, 1, 2, . . . , and the like are sequentially set as CIFs for the CCs forming a secondary cell group.

The UE transmits, to a BS, the selected M UCIs through a Physical Uplink Control CHannel (PUCCH) of each serving cell, in operation S530. In the process, a UCI set with simultaneous UCI transmission indication is selected from among UCIs that are not selected from the K UCIs, and the selected UCI may be transmitted through a PUCCH or a PUSCH of a serving cell of the UCI in accordance with the third embodiment. For example, when M is 1 and K is 2, a UCI having the lowest CIF or a UCI with a high priority is selected and transmitted through a PUCCH. As shown in FIG. 3 or FIG. 4, a UCI set with the UCI simultaneous transmission indication may be transmitted through a PUCCH or a PUSCH of a corresponding serving cell. As a scheme of configuring a UCI simultaneous transmission indicator (simultaneous UCI Tx indicator) with respect to a secondary cell, the UE may execute reception from the BS through an RRC signaling scheme of FIG. 3 or a MAC signaling of FIG. 4.

In the embodiment shown in FIG. 5, M is less than or equal to the number N of serving cells where M is a natural number greater than or equal to 1. Also, the UE may receive the M value from the BS. That is, the UE may receive information associated with M from the BS, through an RRC or MAC signaling.

Also, the UE may exclude, from the selection, one or more UCIs, which are configured to be transmitted through a PUSCH, from among the UCIs. The excluded UCIs may not need to be transmitted through a PUCCH. Also, the UE may transmit a UCI of a secondary cell from the UCIs through piggybacking in a PUSCH resource.

Figure 6:
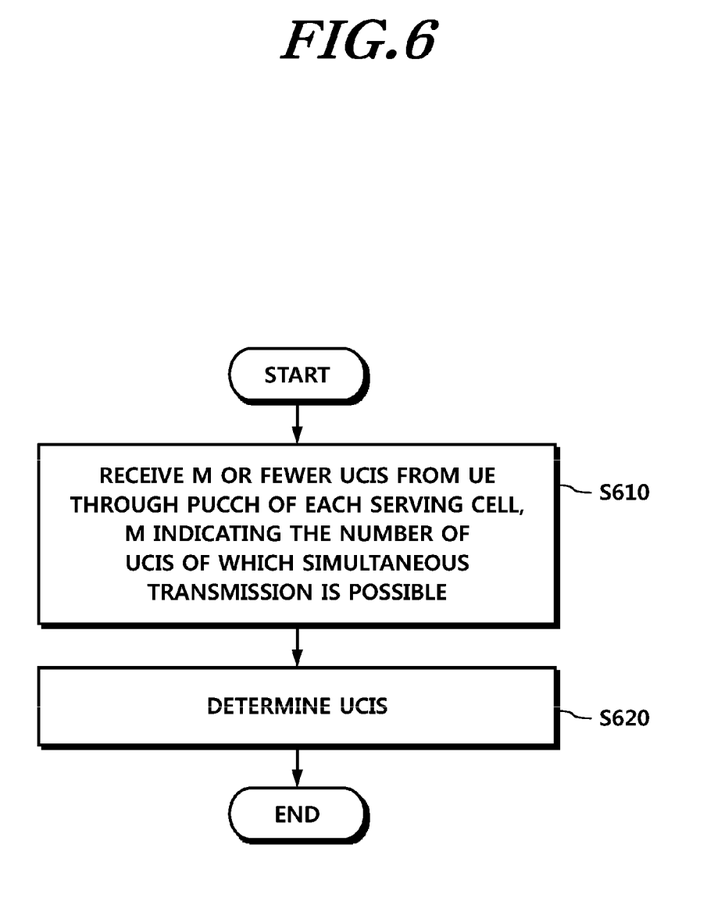
FIG. 6 is a diagram illustrating a process of a Base Station (BS) for controlling transmission of uplink control information in a plurality of serving cells, according to an embodiment of the present disclosure.

FIG. 6 is a flowchart illustrating a process of a BS for controlling transmission of uplink control information in a plurality of serving cells, according to an embodiment of the present disclosure.

The BS receives UCIs fewer than M from the UE through a Physical Uplink Control CHannel (PUCCH) of each serving cell, where M indicates the number of UCIs available for simultaneous transmission in operation S610. The M or fewer UCIs are UCIs selected by the UE in the process of FIG. 5. The BS determines the received UCIs in operation S620. The UE is characterized to transmit more than one UCI, which is less than K through the PUCCH, when the number K of UCIs to be simultaneously transmitted is greater than M. When M is less than or equal to the number N of serving cells and when M is a natural number greater than or equal to 1, the BS receives a UCI selected by the UE.

In the third embodiment, the BS may transmit a UCI simultaneous transmission indicator to the UE. That is, the BS transmits, to the UE, a simultaneous UCI transmission indicator associated with a secondary cell through an RRC or MAC signaling, and the embodiments thereof have been described in FIG. 3 and FIG. 4. To transmit the number M of simultaneous UCI transmissions, as described in the fourth embodiment, the BS may transmit information associated with M to the UE through an RRC or MAC signaling. Also, the BS may receive a UCI of a secondary cell out of the UCIs through piggybacking in a PUSCH resource allocated to the UE.

As described, when a scheduler of each serving cell is distributed in inter-eNB CA and a CA environment based on dual connectivity with a small cell, a UE and a BS control uplink control channel transmission which independently transmits a UCI for each serving cell. Hereinafter, configuration of such UE and BS will be described.

Figure 7:
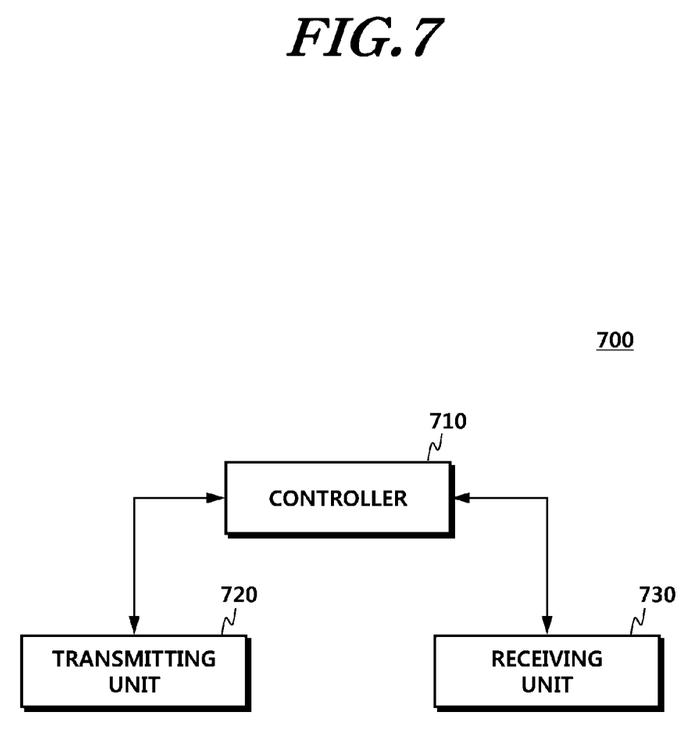
FIG. 7 is a diagram illustrating a configuration of a UE according to another embodiment of the present disclosure.

FIG. 7 is a diagram illustrating a configuration of a UE according to an embodiment.

Referring to FIG. 7, a UE 700 according to an embodiment may include a receiving unit 730, a controller 710, and a transmitting unit 720.

The receiving unit 730 may receive, from a BS, downlink control information, data, and a message, through a corresponding channel.

Also, when a scheduler of each serving cell is distributed in inter-eNB CA and a CA environment based on dual connectivity with a small cell, the controller 710 may control general operations of the UE in association with independent transmission of a UCI for each serving cell.

The transmitting unit 720 transmits, to the BS, uplink control information, data, and a message, through a corresponding channel.

Particularly, referring to the first, second, third, and fourth embodiments, in a method for the UE to control transmission of uplink control information in a plurality of serving cells, the controller 710 i) compares the number of UCIs to be simultaneously transmitted and the number M of UCIs available for simultaneous transmission and ii) selects M UCIs from the UCIs available for simultaneous transmission when K is greater than M. As described in the first and the second embodiments, the controller 710 may select a UCI of a serving cell having the lowest CIF, or may select a UCI based on a priority of a UCI, for example, a priority set based on a type of a respective UCI. Alternatively, the controller 710 may select a UCI of a serving cell having the highest CIF. As described, a comparatively high priority may be assigned to a HARQ ACK/NACK feedback with respect to downlink data and a comparatively low priority may be assigned to an SR and CQI/CSI feedback. That is, according to the first and the fourth embodiments, the UE may select a UCI from K UCIs based on a Carrier Indicator Field (CIF) of a serving cell. Also, according to the second and the fourth embodiments, the controller 710 may select a UCI from the K UCIs based on a priority set with a respective UCI. When the first and the second embodiments are applied, M may be 1. In this instance, the UE may select a single UCI.

Also, when serving cells are classified into a plurality of serving cell groups, the controller 710 may select a UCI based on a CIF of a serving cell where uplink control information of a corresponding serving cell group is transmitted to.

Particularly, the serving cells are classified into two or more serving cell groups. The controller 710 defines differential priorities of the serving cell groups and selects a UCI based on a priority of a corresponding serving cell group. Also, to define the priorities, the controller 710 may define a master cell group to have a priority higher than that of a secondary cell group when defining priorities of cell groups for transmission of uplink control information. This indicates prioritizing a cell group itself and may be applied when a CIF is independently configured for each cell group, for example, when 0, 1, 2, . . . , and the like are sequentially set as CIFs for the CCs forming a master cell group and 0, 1, 2, . . . , and the like are sequentially set as CIFs for the CCs forming a secondary cell group.

The transmitting unit 720 transmits, to the BS, the M selected UCIs through a Physical Uplink Control CHannel (PUCCH) of each serving cell in operation S530. In the process, by applying the third embodiment, a UCI in which simultaneous UCI transmission indication is configured is selected from among UCIs that are not selected out of the K UCIs, and may be transmitted through a PUCCH or a PUSCH of a serving cell of the UCI. For example, when M is 1 and K is 2, a UCI having the lowest CIF or a UCI with a high priority is selected and transmitted through a PUCCH. As shown in FIG. 3 or FIG. 4, a UCI in which UCI simultaneous transmission indication is configured may be transmitted through a PUCCH or a PUSCH of a corresponding serving cell. In a scheme in which the UE configures, from the BS, a UCI simultaneous transmission indicator (simultaneous UCI Tx indicator) with respect to a secondary cell, the receiving unit 730 may execute reception through an RRC signaling scheme of FIG. 3 or a MAC signaling of FIG. 4.

In the embodiment of FIG. 5, M is less than or equal to the number N of serving cells, and is a natural number greater than or equal to 1. Also, the UE may receive the M value from the BS. That is, the UE may receive information associated with M from the BS, through an RRC or MAC signaling.

Also, the controller 710 may exclude, from the selection, one or more UCIs, which are configured to be transmitted through a PUSCH, from among the UCIs. The excluded UCIs may not need to be transmitted through a PUCCH. Also, the transmitting unit 720 may transmit a UCI of a secondary cell out of the UCIs through piggybacking in a PUSCH resource.

Figure 8:
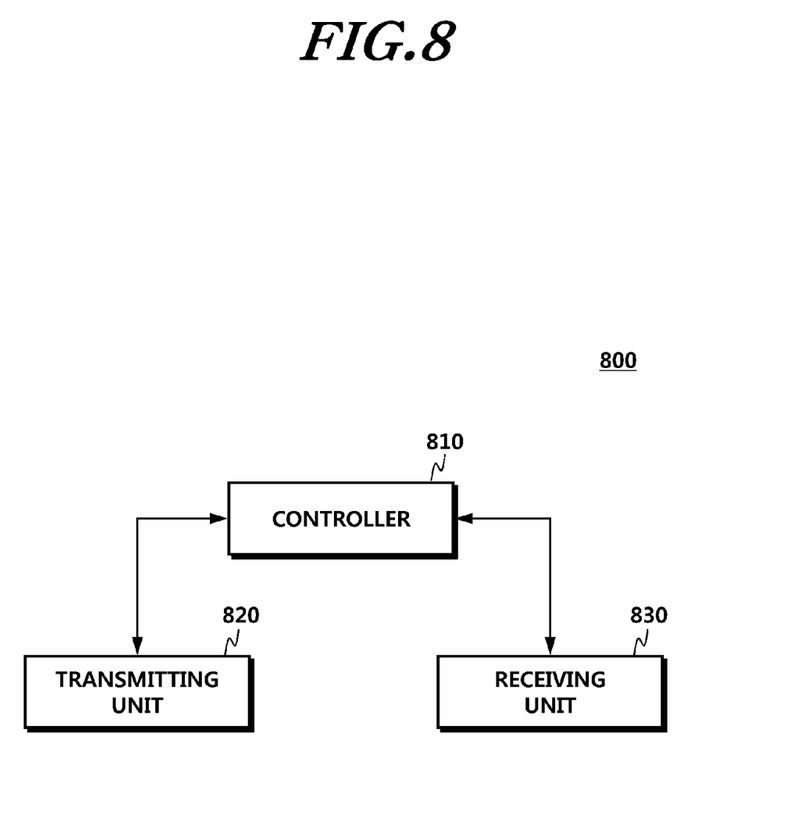
FIG. 8 is a diagram illustrating a configuration of a BS according to another embodiment of the present disclosure.

FIG. 8 is a diagram illustrating a configuration of a BS according to an embodiment of the present disclosure.

Referring to FIG. 8, a BS 800 according to an embodiment may include a controller 810, a transmitting unit 820, and a receiving unit 830.

When a scheduler of each serving cell is distributed in inter-eNB CA and a CA environment based on dual connectivity with a small cell, the controller 810 may control general operations of the BS in association with independent transmission of a UCI for each serving cell. The transmitting unit 1020 and the receiving unit 1030 may be used for transmitting and receiving a signal or a message and data required for implementing the above described present disclosure, to/from a UE.

The receiving unit 830 of the BS receives UCIs fewer than M from the UE through a Physical Uplink Control CHannel (PUCCH) of each serving cell where M indicates the number of UCIs available for simultaneous transmission. The M or fewer UCIs are UCIs selected by the UE selects in the process of FIG. 5. The controller 810 of the BS determines the received UCIs. The UE is characterized to transmit UCI more than one less than K through the PUCCH when the number K of UCIs to be simultaneously transmitted is greater than M. When M is less than or equal to the number N of serving cells and when M is a natural number greater than or equal to 1, the receiving unit 730 of the BS receives a UCI selected by the UE.

In the third embodiment, the transmitting unit 820 of the BS may transmit a UCI simultaneous transmission indicator to the UE. That is, the transmitting unit 820 transmits, to the UE, a simultaneous UCI transmission indicator associated with a secondary cell through an RRC or MAC signaling, and the embodiments thereof have been described in FIG. 3 and FIG. 4. To transmit the number M of simultaneous UCI transmissions, as shown in the fourth embodiment, the transmitting unit 820 may transmit information associated with M to the UE through an RRC or MAC signaling. Also, the receiving unit 830 may receive a UCI of a secondary cell out of the UCIs through piggybacking in a PUSCH resource allocated to the UE.

In accordance with the embodiments of the present disclosure, a serving cell having a low (or high) CIF value may be preferentially selected, as described above.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, the embodiments disclosed in the present disclosure are intended to illustrate the scope of the technical idea of the present disclosure, and the scope of the present invention is not limited by the embodiment. The scope of the present disclosure shall be construed on the basis of the accompanying claims in such a manner that all of the technical ideas included within the scope equivalent to the claims belong to the present disclosure.

The invention claimed is:

1. A method of a User Equipment (UE) for controlling transmission of uplink control information in a plurality of serving cells, the method comprising:
    comparing a number K of Uplink Control Informations (UCIs) to be simultaneously transmitted and a number M of UCIs available for simultaneous transmission and selecting M UCIs from UCIs to be simultaneously transmitted when the number K is greater than the number M; and
    transmitting, to a Base Station (BS), the selected M UCIs through a Physical Uplink Control CHannel (PUCCH) of each serving cell,
    wherein the number M is less than or equal to a number N of serving cells, and the number M is a natural number greater than or equal to 1; and
    wherein the selecting includes:
    selecting UCIs from the K UCIs, based on at least one of a priority set with each UCI and a Carrier Indicator Field (CIF) of a serving cell.

2. The method as claimed in claim 1, wherein:
    the serving cells are classified into two or more serving cell groups; and
    the selecting comprises performing at least one of:
    selecting UCIs based on CIFs of serving cells where uplink control information of the two or more serving cell groups are transmitted to; and
    defining differential priorities of serving cell groups and selecting UCIs based on the priorities of the serving cell groups.

3. The method as claimed in claim 1, wherein the priority is set based on a type of each UCI.

4. The method as claimed in claim 1, wherein the transmitting comprises:
    selecting UCIs set with simultaneous UCI transmission indication from among UCIs that are not selected from the K UCI; and
    transmitting the selected UCI through one of a PUCCH and a Physical Uplink Shared CHannel (PUSCH) of a serving cell of the UCI.

5. The method as claimed in claim 4, further comprising:
    receiving, from the BS, a simultaneous UCI transmission indicator associated with a secondary cell, through an RRC or MAC signaling.

6. The method as claimed in claim 1, wherein the selecting comprises excluding one or more UCIs set to be transmitted in a PUSCH among the UCIs.

7. The method as claimed in claim 1, wherein the UE transmits a UCI of a secondary cell from among the UCIs through piggybacking in an allocated PUSCH resource.

8. A method of a Base Station (BS) for receiving uplink control information in a plurality of serving cells, the method comprising:
    receiving, from a User Equipment (UE), M or fewer Uplink control informations (UCIs) through a Physical Uplink Control CHannel (PUCCH) of each serving cell, where M indicates a number of UCIs of available for simultaneous transmission; and
    determining the UCIs,
    wherein, when a number K of UCIs to be simultaneously transmitted by the UE is greater than the number M of UCIs available for simultaneous transmission, the UE selects one or less than K UCIs based on at least one of a priority set with each UCI and a Carrier Indicator Field (CIF) of a serving cell, and transmits the selected one or less than K UCIs through the PUCCH, and wherein the number M is less than or equal to a number N of serving cells, and the number M is greater than or equal to 1.

9. The method as claimed in claim 8, wherein the BS receives a UCI of a secondary cell from among the UCIs through piggybacking in a PUSCH resource allocated to the UE.

10. A User Equipment (UE) for controlling transmission of uplink control information in a plurality of serving cells, the UE comprising:

a receiving unit configured to receive a signal from a Base Station (BS);

a controller configured to compare a number K of UCIs to be simultaneously transmitted and a number M of UCIs available for simultaneous transmission and configured to select M UCIs from the UCIs to be simultaneously transmitted when the number K is greater than the number M; and a transmitting unit configured to transmit the selected M UCIs to the BS through a Physical Uplink Control CHannel (PUCCH) of each serving cell, wherein the number M is less than or equal to a number N of serving cells, and the number M is a natural number greater than or equal to 1; and wherein the controller is configured to select UCIs from the K UCIs, based on at least one of a priority set with each UCI and a Carrier Indicator Field (CIF) of a serving cell.

11. The UE as claimed in claim 10, wherein:

the serving cells are classified into two or more serving cell groups; and the controller is configured to perform at least one of:

selecting UCIs based on CIFs of serving cells where uplink control information of the two or more serving cell groups are transmitted to; and defining differential priorities of the serving cell groups and selecting UCIs based on the priorities of the serving cell groups.

12. The UE as claimed in claim 10, wherein the priority is set based on a type of each UCI.

13. The UE as claimed in claim 10, wherein the transmitting unit is configured to:

select a UCI set with simultaneous UCI transmission indication from among UCIs that are not selected from the K UCIs; and transmit the UCI through a PUCCH or a Physical Uplink Shared CHannel (PUSCH) of a serving cell of the UCI.

14. The UE as claimed in claim 13, wherein the receiving unit is configured to receive, from the BS, a simultaneous UCI transmission indicator associated with a secondary cell, through an RRC or MAC signaling.

15. The UE as claimed in claim 10, wherein the controller is configured to exclude, from the selection, one or more UCIs, which are set to be transmitted in a PUSCH, from among the UCIs.

16. The UE as claimed in claim 10, wherein the transmitting unit is configured to transmit a UCI of a secondary cell from the UCIs through piggybacking in a PUSCH resource allocated to the UE.

17. The method as claimed in claim 1, wherein the selecting includes:

performing a first UCI selection based on the priority of each UCI; and when UCIs having a same priority are associated with at least two serving cells, performing a second UCI selection between the UCIs having the same priority, based on CIFs of the at least two serving cells.

18. The method as claimed in claim 8, the UE is configured to:

perform a first UCI selection based on the priority of each UCI; and when UCIs having a same priority are associated with at least two serving cells, perform a second UCI selection between the UCIs having the same priority, based on CIFs of the at least two serving cells.

19. The UE as claimed in claim 10, wherein the controller is configured to:

perform a first UCI selection based on the priority of each UCI; and when UCIs having a same priority are associated with at least two serving cells, perform a second UCI selection between the UCIs having the same priority, based on CIFs of the at least two serving cells.

* * * * *